US010885372B2

(12) United States Patent
Tsunoda et al.

(10) Patent No.: US 10,885,372 B2
(45) Date of Patent: Jan. 5, 2021

(54) IMAGE RECOGNITION APPARATUS, LEARNING APPARATUS, IMAGE RECOGNITION METHOD, LEARNING METHOD, AND STORAGE MEDIUM

(71) Applicant: CANON KABUSHIKI KAISHA, Tokyo (JP)

(72) Inventors: Takamasa Tsunoda, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 15/973,960

(22) Filed: May 8, 2018

(65) Prior Publication Data
US 2018/0330183 A1 Nov. 15, 2018

(30) Foreign Application Priority Data

May 11, 2017 (JP) .................................. 2017-094694

(51) Int. Cl.
| | |
|---|---|
| *G06K 9/46* | (2006.01) |
| *G06K 9/62* | (2006.01) |
| *G06N 3/08* | (2006.01) |
| *G06N 3/04* | (2006.01) |
| *G06K 9/00* | (2006.01) |

(52) U.S. Cl.
CPC ............ *G06K 9/46* (2013.01); *G06K 9/6227* (2013.01); *G06K 9/6257* (2013.01); *G06K 9/6262* (2013.01); *G06K 9/6267* (2013.01); *G06N 3/0445* (2013.01); *G06N 3/0454* (2013.01);
(Continued)

(58) Field of Classification Search
CPC ........................ G06K 2209/15; G06K 9/00281

USPC ....... 382/103, 159, 118, 228, 255, 128, 181, 382/260, 247; 706/37, 36; 380/46
See application file for complete search history.

(56) References Cited

U.S. PATENT DOCUMENTS

| | | | | |
|---|---|---|---|---|
| 2007/0086621 | A1* | 4/2007 | Aggarwal | G06K 9/00369 382/103 |
| 2012/0183187 | A1* | 7/2012 | Sasaki | G06T 7/0012 382/128 |

(Continued)

OTHER PUBLICATIONS

Alex Krizhevsky et al; Imagenet classification with deep convolutional neural network; pp. 1-9.

(Continued)

*Primary Examiner* — Kiet M Doan
(74) *Attorney, Agent, or Firm* — Canon U.S.A., Inc. IP Division

(57) ABSTRACT

A Deep Neural Network (DNN) having a plurality of recognition tasks with different scales makes it possible to perform recognition processing in a network where identification layers are branched from one intermediate layer. An image recognition apparatus for recognizing a target includes a first acquisition unit configured to acquire from an input image a first intermediate feature amount for performing first identification, a first identification unit configured to perform the first identification based on the first intermediate feature amount, a second acquisition unit configured to acquire from the first intermediate feature amount a second intermediate feature amount for performing second identification having a larger scale than the first identification, and a second identification unit configured to perform the second identification based on the second intermediate feature amount.

16 Claims, 16 Drawing Sheets

(52) U.S. Cl.
CPC ............... *G06N 3/08* (2013.01); *G06N 3/084* (2013.01); *G06K 9/00718* (2013.01)

(56) References Cited

U.S. PATENT DOCUMENTS

| | | | | |
|---|---|---|---|---|
| 2013/0301885 A1* | 11/2013 | Mori | ................. | G06K 9/00221 382/118 |
| 2016/0086322 A1* | 3/2016 | Arita | ....................... | E01B 35/02 382/154 |
| 2016/0140435 A1* | 5/2016 | Bengio | ................... | G06F 17/28 382/158 |
| 2019/0251399 A1* | 8/2019 | Mariyama | ................ | G06N 3/04 |

OTHER PUBLICATIONS

Bolei Zhou et al; Object detectors emerge in deep scene CNNs; pp. 1-12.

Alex Graves et al;Speech recognition with deep recurrent neural networks.

Jeff Donahue et al; DeCAF: A Deep Convolutional Activation Feature for Generic Visual Recognition.

Xi Li et al; DeepSaliency: Multi-Task Deep Neural Network Model for Salient Object Detection; IEEE Transactions on Image Processing; vol. 25, No. Aug. 8, 2016 pp. 3919-3930.

Karen Simonyan et al; Two-Stream Convolutional Networks for Action Recognition in Videos; pp. 1-9.

Khurram Soomro et al; UCF101: A Dataset of 101 Human Actions Classes From Videos in the Wild; Nov. 2012.

Li Shen et al; Shadow optimization from structured deep edge detection; pp. 2067-2074.

* cited by examiner

EXAMPLE OF CAMERA ARRANGEMENT 151

153 CAMERA

152 COURT

101 ONE FRAME OF MOVING IMAGE (STILL IMAGE)

104 BALL
102 PLAYER
103 PLAYER REGION

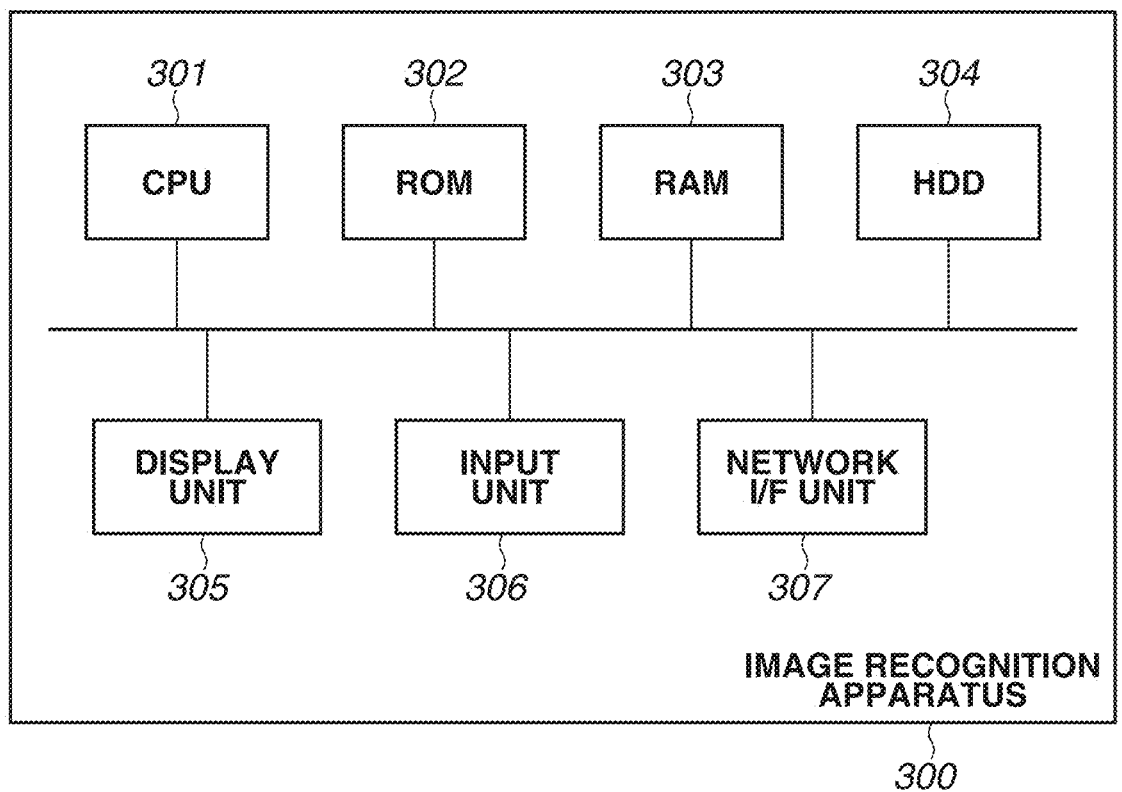

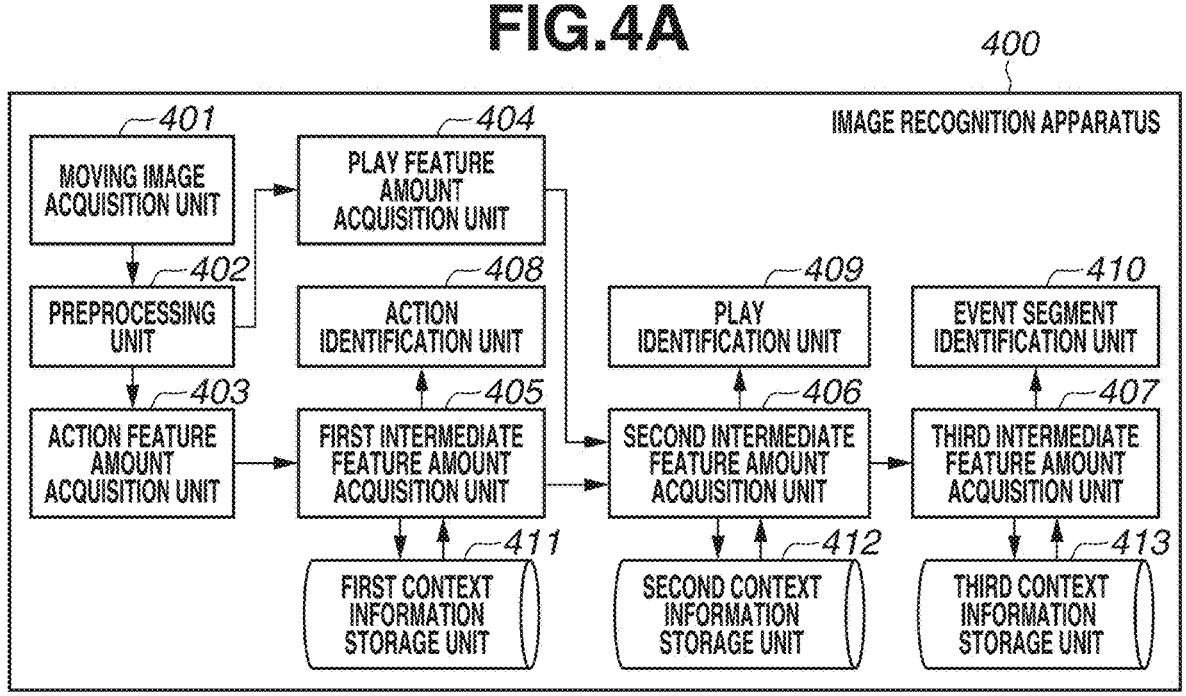
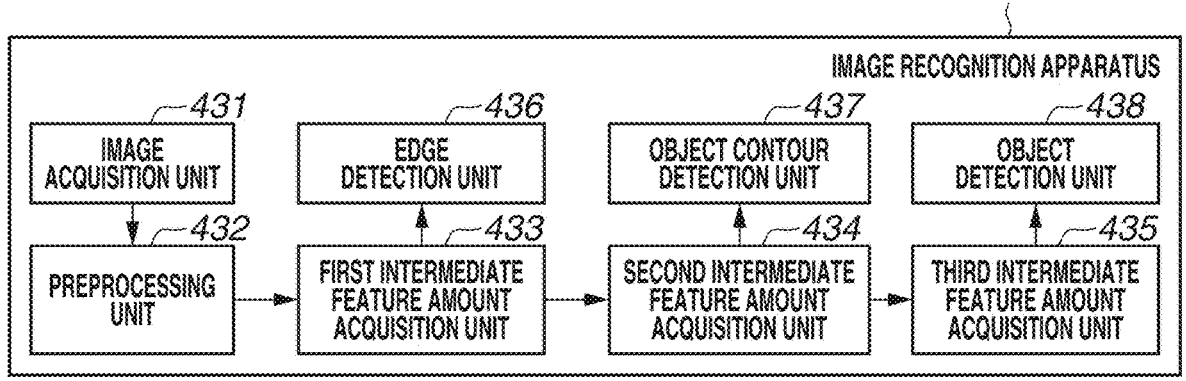
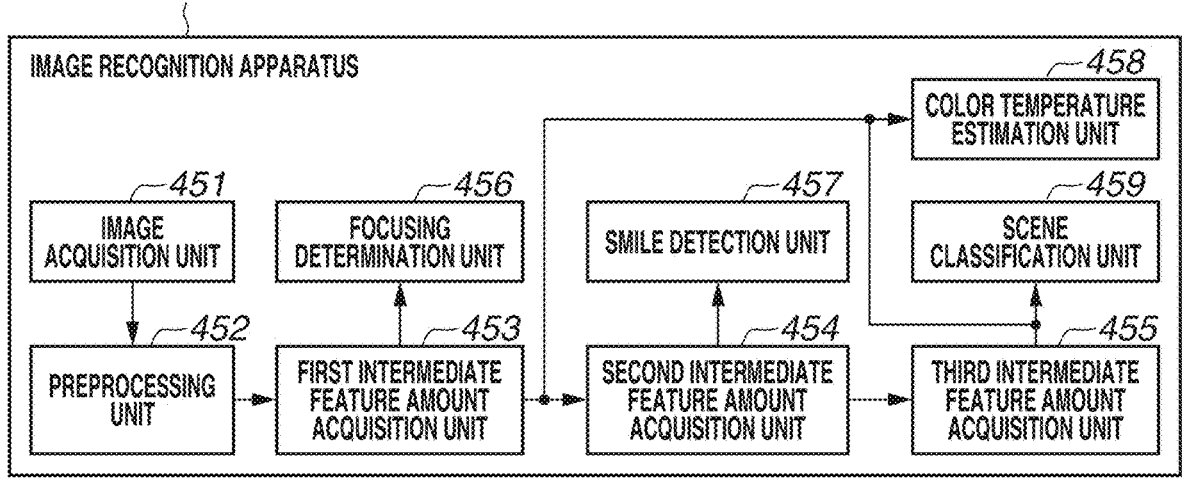

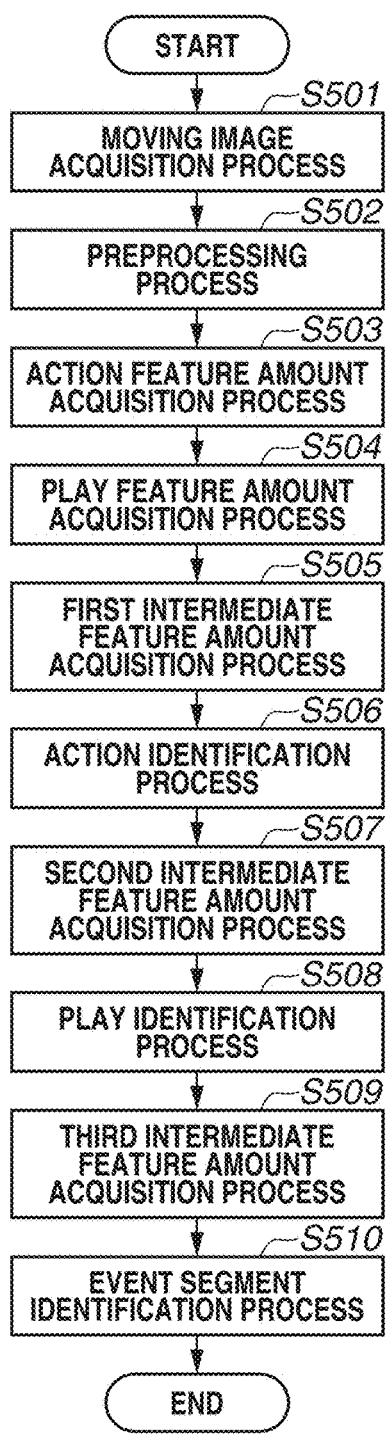
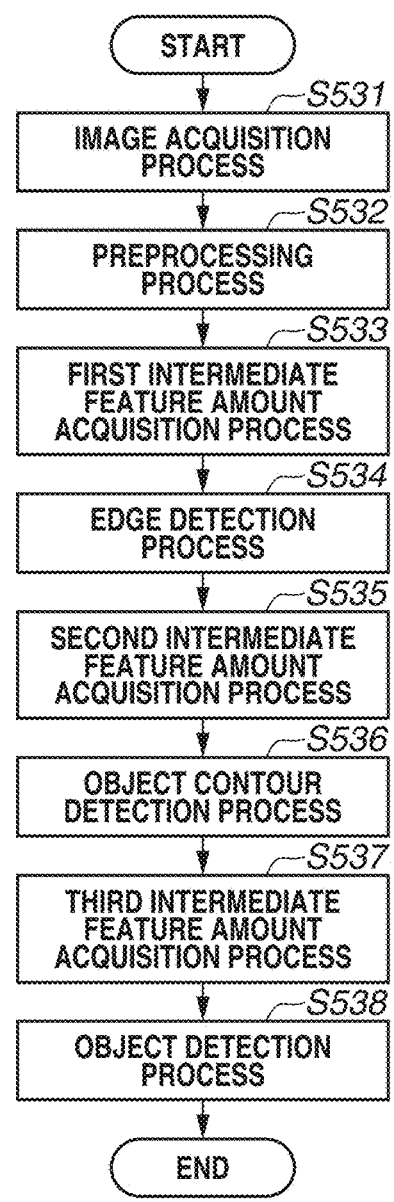
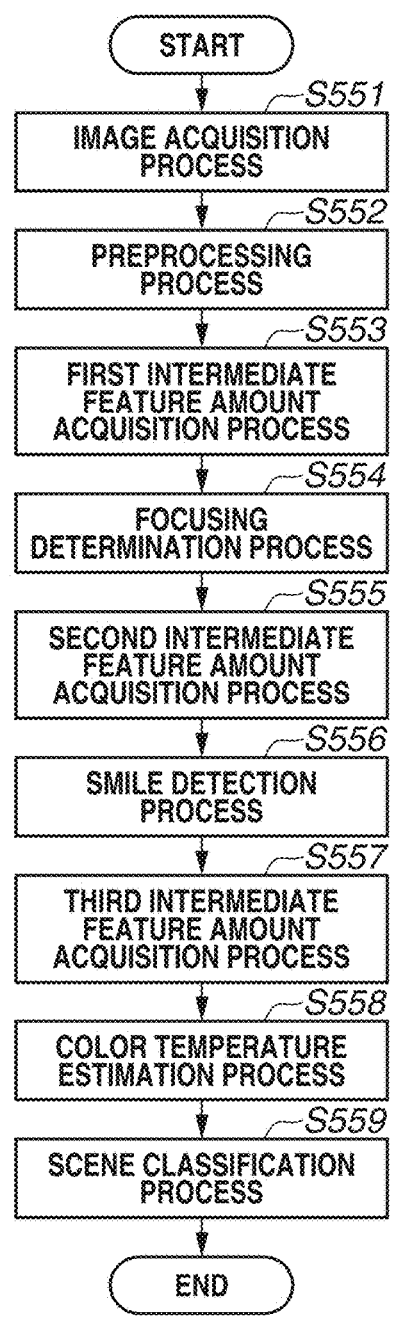

IMAGE RECOGNITION APPARATUS, LEARNING APPARATUS, IMAGE RECOGNITION METHOD, LEARNING METHOD, AND STORAGE MEDIUM

BACKGROUND

Field of the Disclosure

The present disclosure relates particularly to an image recognition apparatus suitable for use in executing a plurality of recognition tasks with different scales, a learning apparatus, a method for controlling the image recognition apparatus and a method for controlling the learning apparatus.

Description of the Related Art

In recent years, techniques for recognizing a target such as an object from a still image and a moving image have been researched in diverse ways. Examples of such techniques include edge detection for extracting line segments in an image, area division for clipping areas having a similar color or texture, parts detection for detecting eyes, a mouth, and other parts of persons, object recognition for detecting a face, a human body, and a physical object, and scene recognition for recognizing an environment and situation in the image. A purpose of recognition processing is referred to as a recognition task. These recognition targets have diverse measures. A recognition apparatus executing individual recognition tasks identifies targets defined at respective scales, based on suitable feature amounts.

Recent years have seen active studies on image recognition based on a multilayer Deep Neural Network (DNN) including a large number of layers. For example, Non-Patent Document 1 (Krizhevsky, A., Sutskever, I., & Hinton, G. E., "Imagenet classification with deep convolutional neural networks", In Advances in neural information processing systems (pp. 1097-1105), 2012) discusses a technique in which regularization, data inflation, and other various techniques are applied to a Convolutional Neural Network (CNN). This technique overcomes overlearning that has conventionally presented a problem, and exhibits remarkably high performance in an object detection task, therefore, it is attracting attention.

Non-Patent Document 2 (Bolei Zhou, Aditya Khosla, Agata Lapedriza, Aude Oliva, Antonio Torralba, "Object detectors emerge in deep scene CNNs", ICLR2015) discusses an in-depth CNN-related investigation. In such a CNN, line segments, simple figures, textures, and other small-scale primitive features are captured in low level intermediate layers which is close to an input layer. In addition, object shapes, more detailed features, and other larger scale features are recognized in high level intermediate layers close to identification layers.

Although a CNN is mainly targeted to an image, there have been active studies also on recognition of time series information such as sound and text based on a Recurrent Neural Network (RNN). Non-Patent Document 3 (Alex Graves, Abdel-rahman Mohamed and Geoffrey Hinston, "Speech recognition with deep recurrent neural networks", Computing Research Repository 2013) discusses a technique for comparatively evaluating the accuracy by applying several types of RNNs to a task for recognizing a phoneme series from sound.

When various measures and granularity such as spatial and time scales of categories defined by recognition tasks are considered based on the above-described studies, a neural network (NN) on a low hierarchical level is sufficient for recognition tasks having small granularity. On the other hand, a NN on a high hierarchical level is desirable for recognition tasks having large granularity.

On the other hand, there has been a number of studies on diverting the feature amount of intermediate layers in a CNN to other recognition tasks (see, for example, Non-Patent Document 4 (J Donahue, Y Jia, O Vinyals, J Hoffman, N Zhang, E Tzeng, T Darrell, "DeCAF: A Deep Convolutional Activation Feature for Generic Visual Recognition", arXiv2013)), and it is known that suitable layers depending on recognition tasks exist. Further, studies on implementing a plurality of recognition tasks through one network by branching an identification layer have been performed (see, for example, Non-Patent Document 5 (Xi Li, Liming Zhao, Lina Wei, MingHsuan Yang, Fei Wu, Yueting Zhuang, Haibin Ling, Jingdong Wang, "DeepSaliency: Multi-Task Deep Neural Network Model for Salient Object Detection", IEEE Transactions on Image Processing, 2015)).

However, as described above, there are various time and spatial scales depending on recognition tasks. Further, depending on circumstances, it may be desirable to divert the feature amount of intermediate layers to other recognition tasks and branch identification layers from one intermediate layer. It has been difficult to implement one network structure in such a case.

SUMMARY

The present disclosure is directed to a DNN including a plurality of recognition tasks with different scales, in which recognition processing can be performed with a network where identification layers are branched from one intermediate layer.

According to an aspect of the present disclosure, an image recognition apparatus for recognizing a target includes a first acquisition unit configured to acquire from an input image a first intermediate feature amount for performing first identification, a first identification unit configured to perform the first identification based on the first intermediate feature amount, a second acquisition unit configured to acquire from the first intermediate feature amount a second intermediate feature amount for performing second identification having a larger scale than the first identification, and a second identification unit configured to perform the second identification based on the second intermediate feature amount.

Further features of the present disclosure will become apparent from the following description of exemplary embodiments with reference to the attached drawings.

BRIEF DESCRIPTION OF THE DRAWINGS

FIG. 3 is a block diagram illustrating an example of a hardware configuration of an image recognition apparatus according to one or more aspects of the present disclosure.

FIGS. 4A, 4B, and 4C are block diagrams illustrating examples of functional configurations of image recognition apparatuses according to one or more aspects of the present disclosure.

FIGS. 5A, 5B, and 5C are flowcharts illustrating examples of procedures performed by the image recognition apparatuses according to one or more aspects of the present disclosure.

DESCRIPTION OF THE EMBODIMENTS

A first exemplary embodiment of the present disclosure will be described below with reference to the accompanying drawings.

For example, to automatically generate a highlight video corresponding with the game contents based on unedited moving images of a team sport game such as soccer and rugby, it is important to recognize temporal segments of game-specific plays and important events as a chain of these plays. In order to recognize a game-specific play in detail, features acquired from the overall video and primitive actions of each player are important clues. More specifically, in order to automatically generate a highlight video corresponding with the game contents, it is important to execute a plurality of recognition tasks. More specifically, it is important to execute hierarchical recognition tasks having at least three different time scales: recognition of player actions, recognition of game-specific plays, and recognition of temporal segments of important events (event segment recognition).

For each recognition task, a higher-level task has a larger time scale and a lower level task has a smaller time scale. Since the higher level task embraces the lower level task, concurrently executing these tasks under one framework is efficient. The present exemplary embodiment will be described below which deals with a moving image of a futsal game as an example. In the example, multitasking with different time scales is executed with a multilayer Bidirectional Long Short-Term Memory (BLSTM) as recognition processing in a RNN. As processing performed at the time of learning, a method for optimizing the network structure of a multilayer BLSTM will be described below.

Figure 1B:
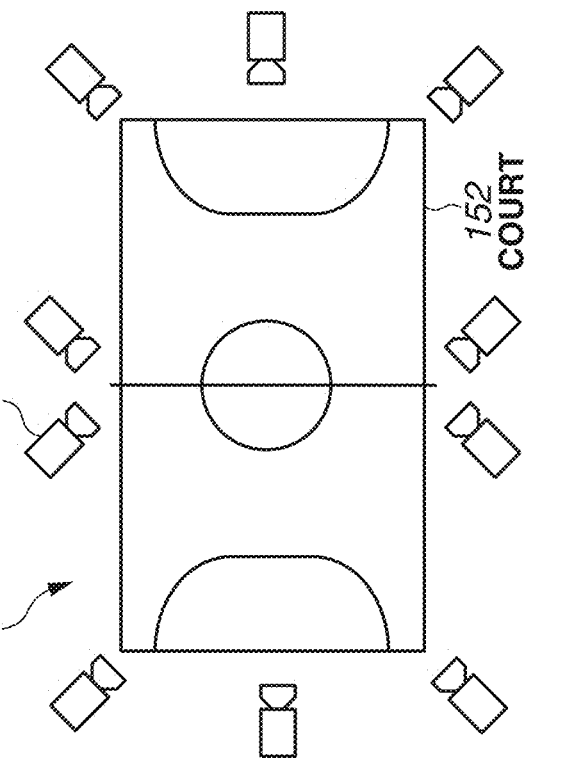
FIGS. 1A and 1B illustrate an example of one frame of a moving image and an example of a camera arrangement.
Figure 1A:
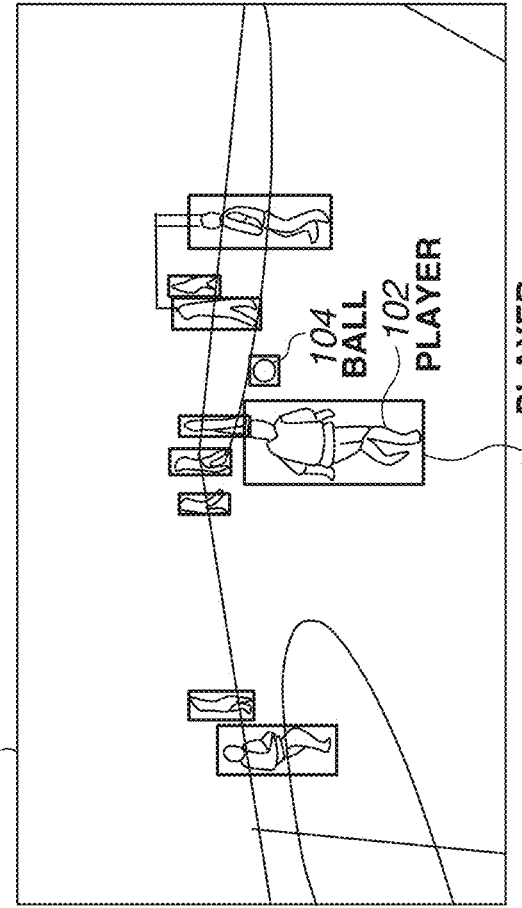

FIG. 1A illustrates an example of one frame (still image) 101 of the moving image of the futsal game acquired in the present exemplary embodiment. Referring to FIG. 1A, the frame 101 of the moving image includes a plurality of players 102 and a ball 104. As illustrated in a camera arrangement example 151 in FIG. 1B, a plurality of cameras 153 is arranged around a court 152, and every player is captured by one camera or another.

Figure 2:
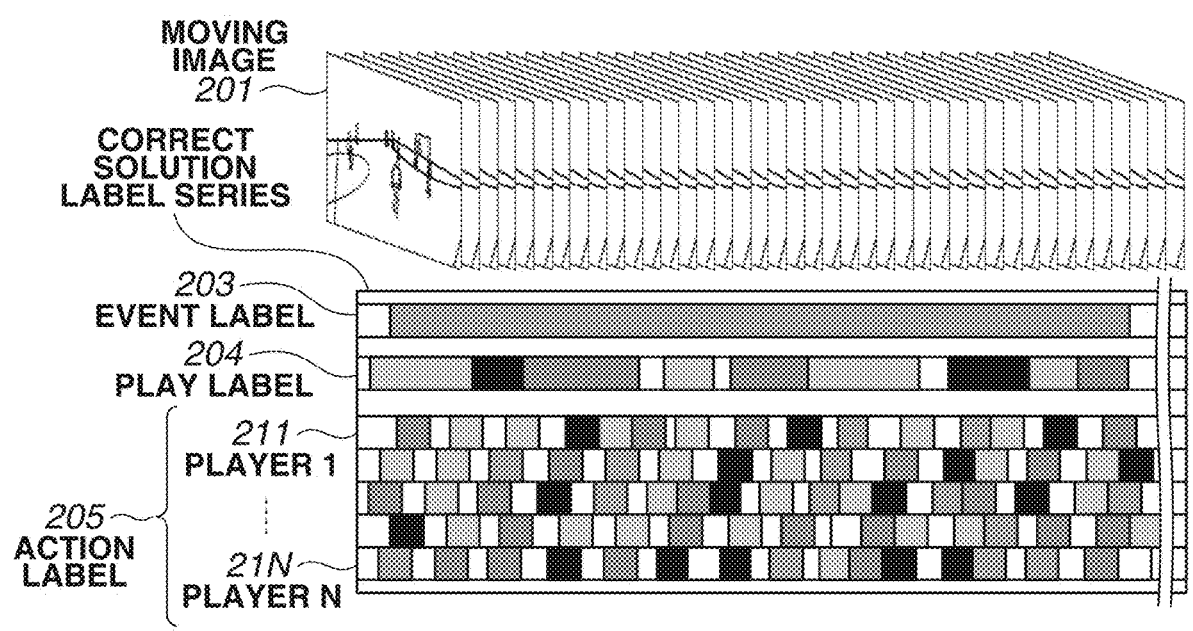
FIG. 2 illustrates a relation between labels with different time scales.

FIG. 2 illustrates a relation between an "event label", a "play label", and an "action label" having different time scales for a moving image 201 (time series of still images). An action label 205 having the smallest time scale expresses general-purpose actions without depending on the kind of sports. There are N players 211 to 21N in the game, and the action label 205 is set for each player. The play label 204 having a larger time scale than the action label 205 expresses game-specific plays defined centering mainly on the ball 104. An event label 203 having the largest time scale expresses temporal segments of important scenes such as goal scenes and shooting scenes. Each of the above-described labels is set to the screen or each player, and a plurality of labels does not exist. Table 1 indicates examples of action labels, play labels, and event labels.

TABLE 1

| Action Label | Play Label | Event Label |
| --- | --- | --- |
| Kick | Pass | Shoot |
| Receive | Shoot | Goal |
| Dribble | Goal | Corner kick |
| Trap | Dribble | Free kick |
| Keep | Clear | |
| Catch | Corner kick | |
| Cut | Free kick | |
| Run | Punt kick | |
| Turn | Intercept | |
| Step | Goalkeeper save | |
| Sliding | | |

FIG. 3 is a block diagram illustrating an example of a hardware configuration of an image recognition apparatus 300 according to the present exemplary embodiment.

Referring to FIG. 3, the image recognition apparatus 300 includes a central processing unit (CPU) 301, a read only memory (ROM) 302, a random access memory (RAM) 303, a hard disk drive (HDD) 304, a display unit 305, an input unit 306, and a network interface (I/F) unit 307. The CPU 301 reads a control program stored in the ROM 302 and performs various processing. The RAM 303 is used as the main memory of the CPU 301 and as a temporary storage area such as a work area. The HDD 304 stores various data and various programs. The display unit 305 displays a variety of information. The input unit 306 is provided with a keyboard and a mouse for receiving various operations by a user.

The network I/F unit 307 performs processing for communicating with an external apparatus such as an image forming apparatus via a network. As another example, the network I/F unit 307 may wirelessly communicate with an external apparatus.

Functions and processing of the image recognition apparatus (described below) are implemented when the CPU 301 reads a program stored in the ROM 302 or HDD 304 and executes the program. As another example, the CPU 301 may read a program stored in such a recording medium as a smart data (SD) card instead of the ROM 302.

FIG. 4A is a block diagram illustrating an example of a functional configuration of an image recognition apparatus 400 according to the present exemplary embodiment.

The image recognition apparatus 400 according to the present exemplary embodiment includes a moving image acquisition unit 401, a preprocessing unit 402, an action feature amount acquisition unit 403, and a play feature amount acquisition unit 404. The image recognition apparatus 400 further includes a first intermediate feature amount acquisition unit 405, a second intermediate feature amount acquisition unit 406, a third intermediate feature amount acquisition unit 407, an action identification unit 408, a play identification unit 409, and an event segment identification unit 410. The image recognition apparatus 400 according to the present exemplary embodiment further includes a first context information storage unit 411, a second context information storage unit 412, and a third context information storage unit 413 as storage units. These functions included in the image recognition apparatus 400 will be described below with reference to FIG. 5A.

FIG. 5A is a flowchart illustrating an example of a procedure performed by the image recognition apparatus 400 according to the present exemplary embodiment.

In step S501, the moving image acquisition unit 401 acquires a series of still images composed of a plurality of frames. For example, the moving image acquisition unit 401 acquires a part of an identification target moving image illustrated in FIG. 1A.

The present exemplary embodiment will deal with a video of a futsal game as a moving image. The length of the final moving image depends on the length of the futsal game. As to the frame rate of a moving image, the standard speed of about 30 frames per second is assumed. In the present process, the moving image acquisition unit 401 acquires a series of still images of a preset length (for example, the length of the game) including several to tens continuous frames from among the entire moving image. In this case, to simplify descriptions, the moving image acquisition unit 401 acquires still images of 60 frames. These 60 frames may be acquired from a moving image prestored in an external apparatus or from a moving image captured by a camera in real time. In the former case, the moving image acquisition unit 401 acquires a series of still images for a predetermined number of frames from the video of the game stored in the external apparatus. In the latter case, the moving image acquisition unit 401 acquires a predetermined number of frames from a series of still images output by the camera. As illustrated in FIG. 1B, on the premise that a moving image has been captured by a plurality of cameras, the moving image acquisition unit 401 acquires a series of still images obtained in each of the plurality of the cameras according to the present process.

In step S502, the preprocessing unit 402 performs preprocessing on a series of the still images acquired in step S501. The preprocessing unit 402 performs tracking on each player and the ball 104 reflected in a series of still images captured by each camera and acquires information of player positions, player regions, and ball position. The player region acquired in this step corresponds to the player region 103 illustrated in FIG. 1A.

Then, the preprocessing unit 402 selects a camera better arranged in terms of the entire screen and each player region from among the plurality of cameras arranged as illustrated in FIG. 1B. According to the present exemplary embodiment, the preprocessing unit 402 selects in terms of the entire screen a camera which is capturing an image of the ball in the first frame at the closest position, and in terms of the player region a camera which is capturing the largest image of a player, of which the player region is not hidden in the first frame. Then, the preprocessing unit 402 performs color component normalization on the first one frame of a series of still images in the entire screen and in each player region, and further performs processing for acquiring an optical flow from a series of still images. An optical flow is acquired herein by using a block matching method between frames.

In step S503, the action feature amount acquisition unit 403 acquires the action feature amount for identifying the action for each player. The action feature amount refers at least to feature amounts related to appearance and motion, calculated from a series of the still images acquired by the moving image acquisition unit 401. Non-Patent Document 6 (Karen Simonyan, Andrew Zisserman, "Two-Stream Convolutional Networks for Action Recognition in Videos", NIPS2015) discusses action classifications for open data set including a moving image of several seconds to several minutes (see Non-Patent Document 7 (Khurram Soomro, Amir Roshan Zamir, Mubarak Shah, "UCF101: A Dataset of 101 Human Actions Classes From Videos in The Wild", CRCV-TR-12-01, 2012)) such as UCF-101 by using two CNNs corresponding to appearance and motion.

In the CNN related to motion, two maps for a perpendicular component and vertical component are divided from a vector field of the optical flow, in one unit. The CNN receives a plurality of stacked patterns of the units (for example, 1, 5, or 10 patterns). According to the present exemplary embodiment, the action feature amount acquisition unit 403 uses the CNN that receives optical flows for 10 units and has learned with action classification tasks of UCF-101, and uses the output of a fully-connected layer before a Softmax identification layer, as the feature amount for motion.

On the other hand, similar to the method discussed in Non-Patent Document 4, the action feature amount acquisition unit 403 uses as the feature amount related to appearance the output of the fully-connected layer before the Softmax identification layer of a CNN that has learned through ILSVRC as an open data set for an object detection task. The method for diverting the intermediate output of the CNN that has previously learned, to another recognition task is a general method as discussed in Non-Patent Document 4, so that more detailed descriptions thereof will be omitted.

In step S504, the play feature amount acquisition unit 404 acquires the play feature amount for identifying a play based on normalized still images of the entire screen and optical flows. In this case, similar to the method performed by the action feature amount acquisition unit 403, the play feature amount acquisition unit 404 acquires the feature amounts related to appearance and motion as the play feature amounts.

Then, the action identification unit 408 identifies an action, a play, and an event segment based on the play feature amounts acquired from the entire screen and the action feature amount for each player. The first intermediate feature amount acquisition unit 405, the second intermediate feature amount acquisition unit 406, and the third intermediate feature amount acquisition unit 407 correspond to a BLSTM having the number of layers optimized in learning processing (described below).

Figure 6:
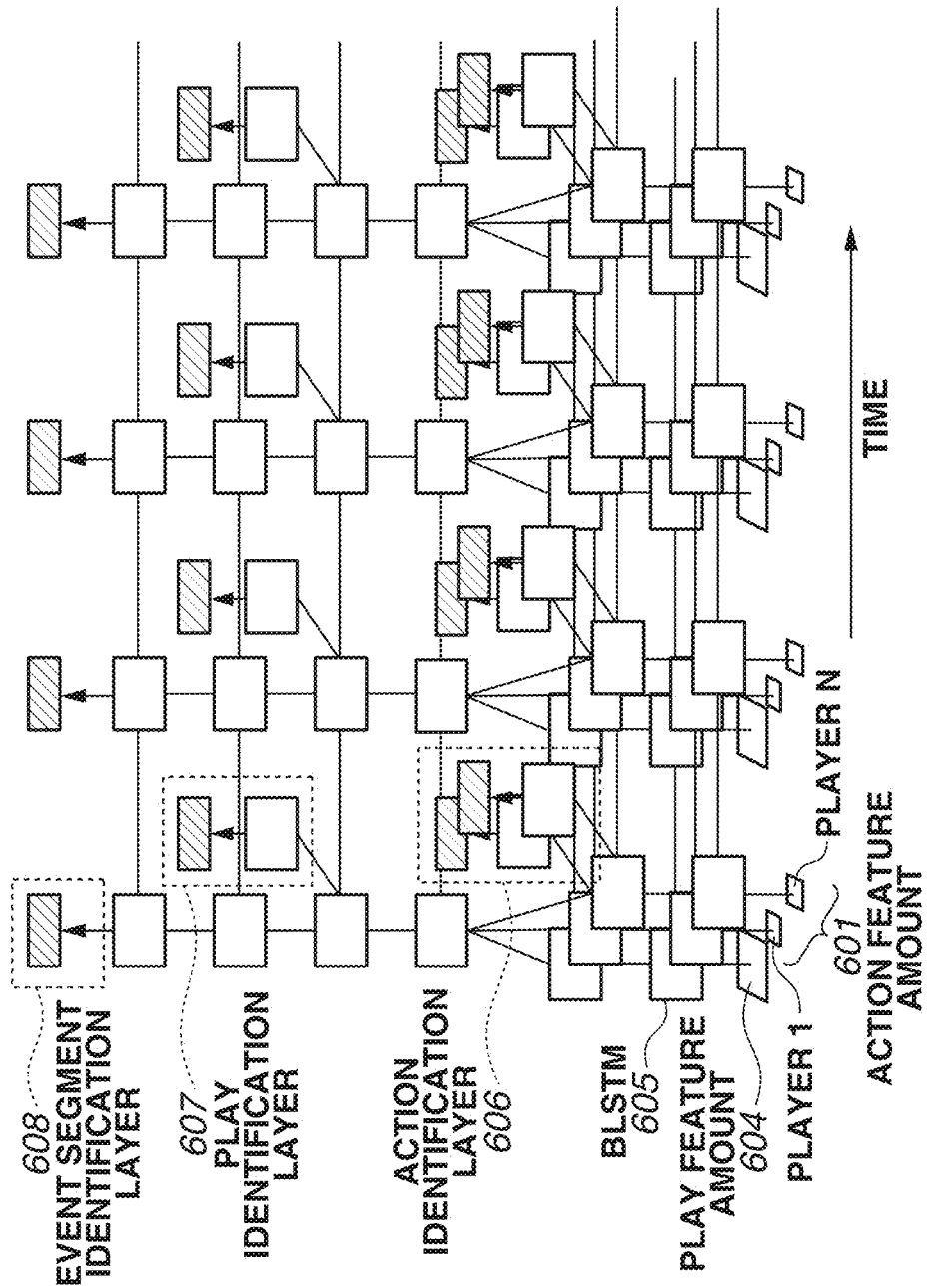
FIG. 6 illustrates an example of a network structure according to one or more aspects of the present disclosure.

FIG. 6 is a schematic view illustrating action, play, and event segment identification layers graphically represented by BLSTM units. As illustrated in FIG. 6, an action feature amount 601 for each player is input to a BLSTM 605 independently composed of a plurality of layers, and an action for each player is identified via an action identification layer 606. A play feature amount 604 acquired from the entire screen is integrated with the action feature amount 601 for each player via the BLSTM 605 composed of a plurality of layers. Then, a play label is identified via the BLSTM 605 composed of a plurality of layers and a play identification layer 607. For the play feature amount 604 and the action feature amount 601, an event label is identified in the final layer via the BLSTM 605 composed of a plurality of layers and an event segment identification layer 608. Each of the action identification layer 606 and the play identification layer 607 is a multilayer identification layer having one Softmax classifier and one intermediate layer, and the event segment identification layer 608 is composed of a Softmax classifier.

In step S505, the first intermediate feature amount acquisition unit 405 acquires the feature amount related to the time series of the action feature amount 601. The first intermediate feature amount acquisition unit 405 is composed of a BLSTM. The first intermediate feature amount of the preceding step is stored in the first context information storage unit 411. The first intermediate feature amount acquisition unit 405 calculates the first intermediate feature amount of the present step based on the action feature amount acquired by the action feature amount acquisition unit 403 and the first intermediate feature amount of the preceding step. A BLSTM that has learned through a method according to learning processing (described below) is used as this BLSTM.

In step S506, the action identification unit 408 calculates an action label identification score by using a Softmax classifier for the first intermediate feature amount of the present step. A learning method for a Softmax classifier will be described below.

In step S507, the second intermediate feature amount acquisition unit 406 acquires the feature amount related to the time series of the play feature amount 604. The second intermediate feature amount acquisition unit 406 is composed of a BLSTM. The second intermediate feature amount of the preceding step is stored in the second context information storage unit 412. The second intermediate feature amount acquisition unit 406 computes the second intermediate feature amount of the present step by calculating the play feature amount 604 acquired by the play feature amount acquisition unit 404, the first intermediate feature amount of the present step, and the second intermediate feature amount of the preceding step. A BLSTM that has learned according to a method based on learning processing (described below) is used as this BLSTM.

In step S508, the play identification unit 409 calculates a play label identification score by using a Softmax classifier for the second intermediate feature amount of the present step.

In step S509, the third intermediate feature amount acquisition unit 407 acquires the third intermediate feature amount of the present step. The third intermediate feature amount acquisition unit 407 is composed of a BLSTM. The third intermediate feature amount of the preceding step is stored in the third context information storage unit 413. The third intermediate feature amount acquisition unit 407 computes the third intermediate feature amount of the present step by calculating the second intermediate feature amount of the present step and the third intermediate feature amount of the preceding step. A BLSTM that has learned through a method based on learning processing (described below) is used as this BLSTM.

In step S510, the event segment identification unit 410 calculates an event label identification score by using a Softmax classifier for the third intermediate feature amount of the present step.

The following describes a learning method for BLSTMs (intermediate layers) and identification layers used in steps S505 to S510 according to the present exemplary embodiment, and a method for optimizing the network structure illustrated in FIG. 6.

Figure 7:
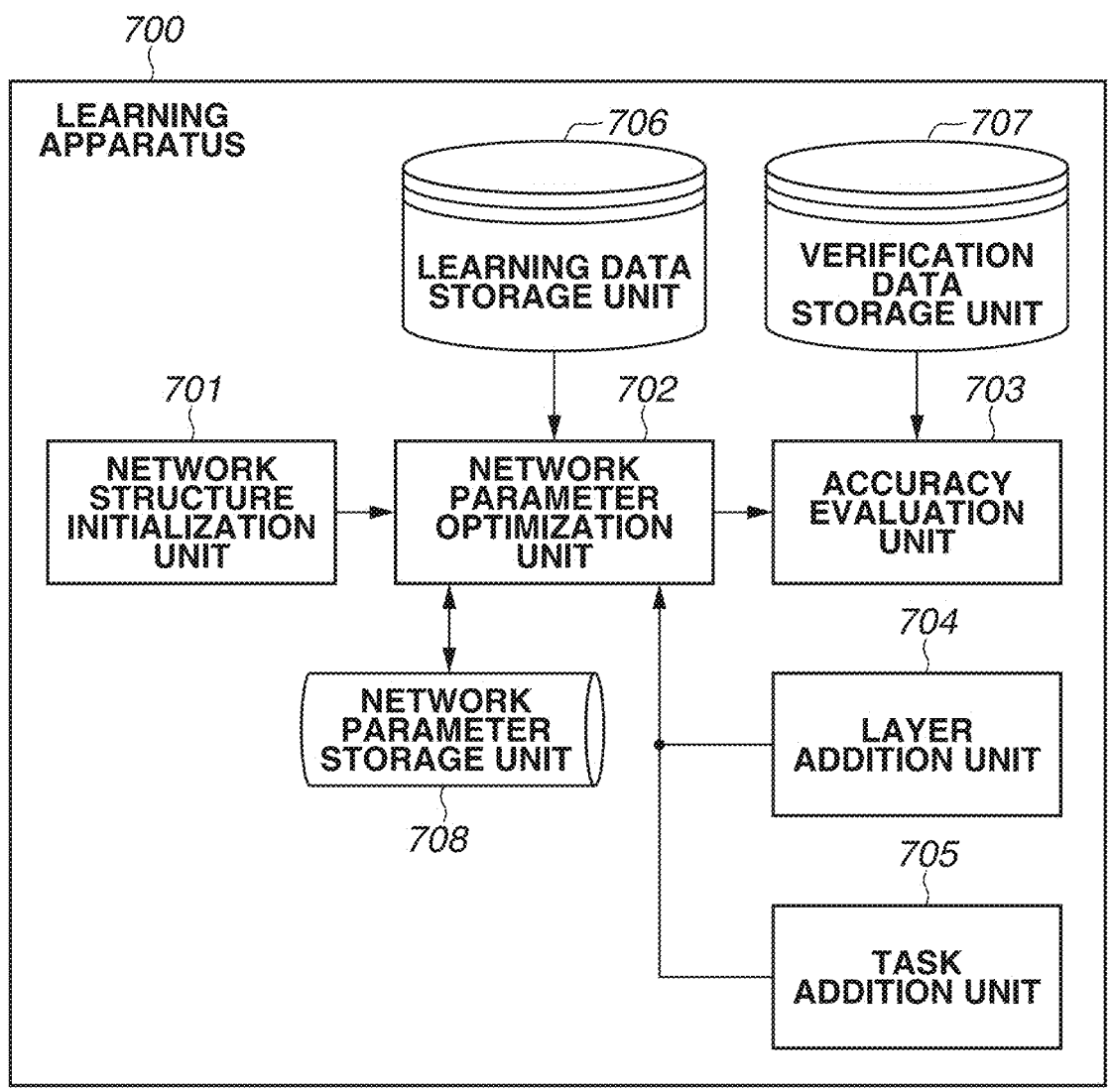
FIG. 7 is a block diagram illustrating an example of a functional configuration of a learning apparatus according to one or more aspects of the present disclosure.

FIG. 7 is a block diagram illustrating an example of a functional configuration of a learning apparatus 700 according to the present exemplary embodiment. The hardware configuration of the learning apparatus 700 according to the present exemplary embodiment is basically similar to the configuration illustrated in FIG. 3.

As illustrated in FIG. 7, the learning apparatus 700 includes a network structure initialization unit 701, a network parameter optimization unit 702, an accuracy evaluation unit 703, a layer addition unit 704, and a task addition unit 705. The learning apparatus 700 further includes a learning data storage unit 706, a verification data storage unit 707, and a network parameter storage unit 708 as storage units.

Figure 8:
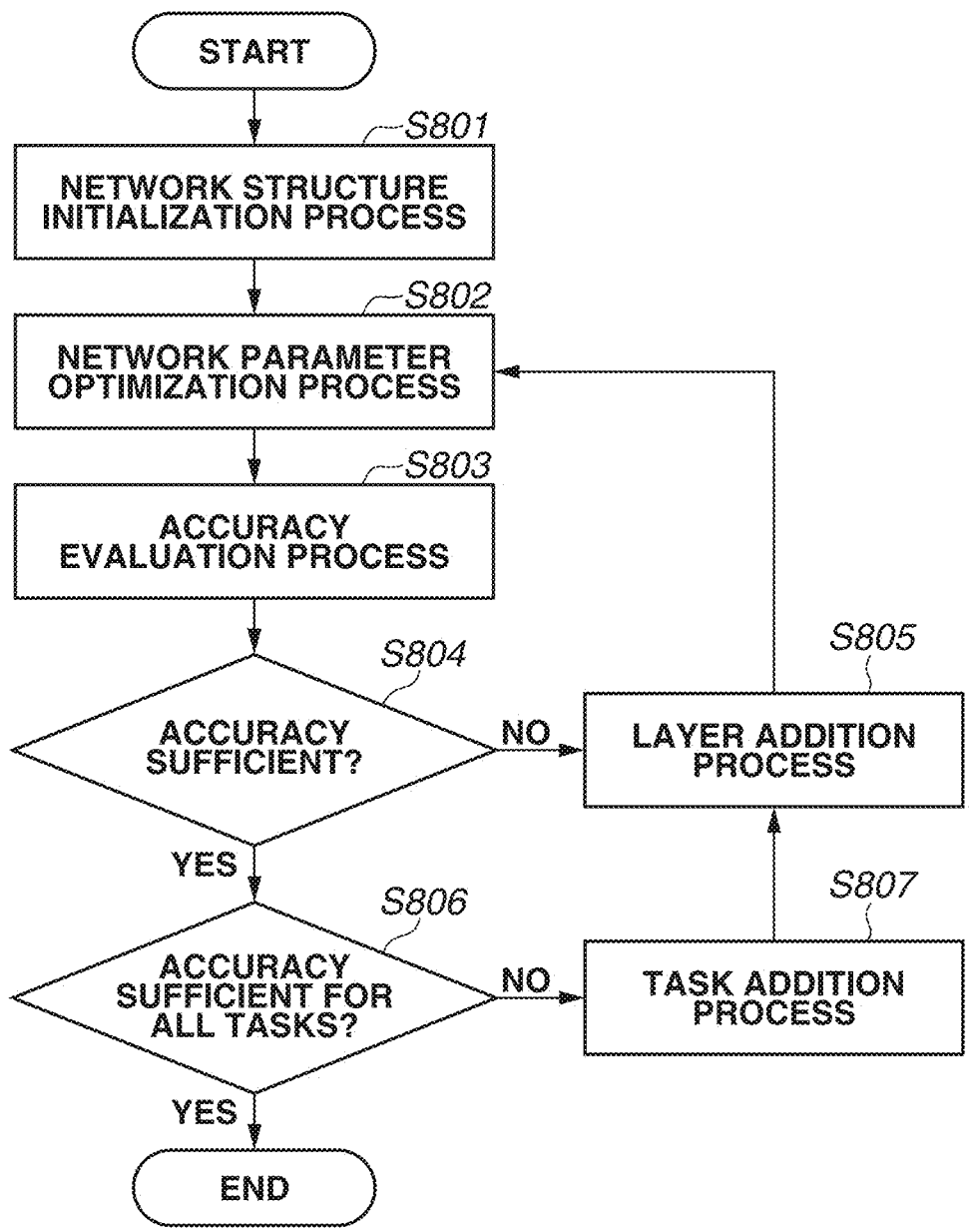
FIG. 8 is a flowchart illustrating an example of a procedure performed by a learning apparatus according to one or more aspects of the present disclosure

FIG. 8 is a flowchart illustrating an example of a processing procedure performed by the learning apparatus 700 according to the present exemplary embodiment. An overview of each process and functions of each component illustrated in FIG. 7 will be described below.

Figure 9:
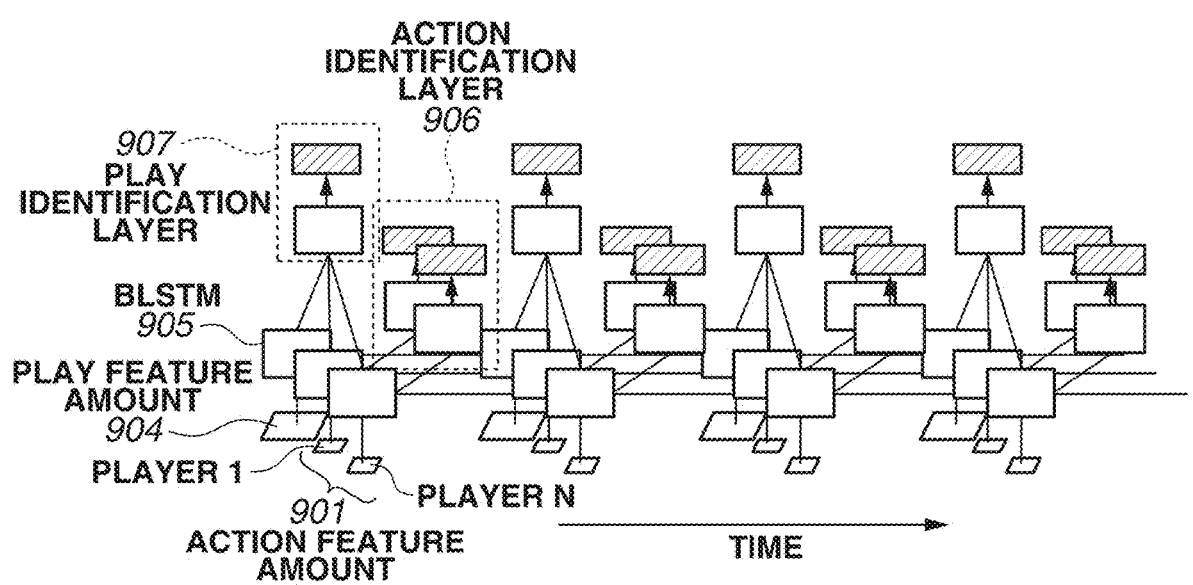
FIG. 9 illustrates an example of a specific initial structure configured in a shallowest network.

In step S801, the network structure initialization unit 701 initializes the recognition layer for each recognition task and the structure of the entire network. According to the present exemplary embodiment, recognition tasks have an initial structure in which an action recognition having the smallest scale and a play recognition having the second smallest scale are configured to be a shallowest network. FIG. 9 illustrates an example of a specific initial structure configured into the shallowest network. Compared to the structure illustrated in FIG. 6, by using an action feature amount 901, a play feature amount 904, a BLSTM 905, an action identification layer 906, and a play identification layer 907, the shallowest network is configured by minimizing the number of intermediate layers and the number of identification layers.

In step S802, the network parameter optimization unit 702 optimizes (learns) parameters of BLSTMs and identification layers constituting a network, by using learning data stored in the learning data storage unit 706. In this case, among the parameters to be optimized, the action identification layer for each player and a BLSTM connected thereto identify labels having the same definition even for different players. There may be many variations of appearances of players in each game. Therefore, the BLSTM and the action identification layer for each player have a weight in common.

Figure 10:
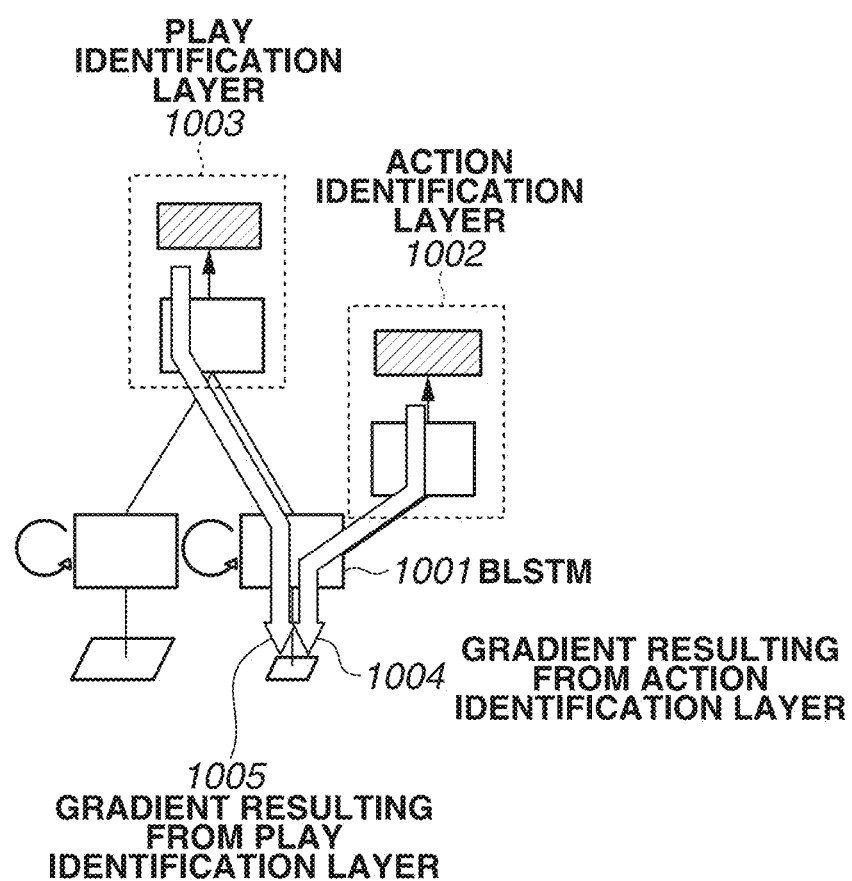
FIG. 10 illustrates gradients resulting from different identification layers.

In this case, according to a time series of still images constituting a moving image, correct solution labels for the event label, the play label, and the action label for each player are prepared as learning data. When optimizing the parameters of each BLSTM and identification layer, the stochastic gradient descent is used. In this case, as illustrated in FIG. 10, a gradient 1005 resulting from a play identification layer 1003 and a gradient 1004 resulting from an action identification layer 1002 are mixed in a BLSTM 1001. Although, in such a BLSTM, a plurality of gradients may be simply averaged, it is also possible to measure an error rate by using verification data, and mix the gradients based on the obtained error rate.

When the total gradient of the BLSTM calculated by the back propagation is $\Delta E$, a gradient resulting from the action identification layer 1002 is $\Delta E^{(1)}$, and a gradient resulting from the play identification layer 1003 is $\Delta E^{(2)}$, the total gradient of the BLSTM is calculated by the following formula (1).

$$\Delta E = \alpha \Delta E^{(1)} + \beta \Delta E^{(2)} \quad (1)$$

α denotes a value proportional to the error rate related to the verification data for action identification, and β denotes a value proportional to the error rate related to the verification data for play identification. α and β are normalized so that their sum total becomes one.

While the learning data is divided into mini-batches to apply the stochastic gradient descent to the optimization of parameters, it is also possible to similarly divide the verification data into mini-batches and calculate an error rate for each mini-batch. This processing allows the mixture ratio to be changed for each mini-batch, giving similar effects to the stochastic gradient descent which changes the gradient for each mini-batch. More specifically, the processing increases the possibility that the solution descends into a better local solution.

Since the action identification is performed for each player, there are correct solution labels for N players and, therefore, gradients for N players can be obtained by the following formula (2).

$$\Delta E(^1) = \Delta E_1(^1) + \Delta E_2(^1) + \ldots + \Delta E_N(^1) \quad (2)$$

When calculating the total gradient of the BLSTM, the following formula (3) may be used instead of the formula (1). In this case, weights for N players are applied to the gradient of play identification. The gradient of action identification may be divided by N in order to cancel the weights for N.

$$\Delta E = (\alpha/N) \Delta E(^1) + \beta \Delta E(^2) \quad (3)$$

The parameters learned in the above-described processing are stored in the network parameter storage unit 708.

In step S803, the accuracy evaluation unit 703 acquires the accuracy of each identification task based on optimized parameters by using the verification data stored in the verification data storage unit 707. More specifically, in the present stage after completion of steps S801 and S802, the accuracy evaluation unit 703 calculates the accuracy for two tasks (action identification and play identification). The verification data used in the present process may be the same as the verification data used for the determination of the mixture ratio for gradients in step S802, or another verification data may be prepared.

In step S804, the accuracy evaluation unit 703 determines whether the accuracy acquired in step S803 is equal to or larger than a threshold value. When the accuracy is less than the threshold value and not sufficient (NO in step S804), the processing proceeds to step S805. On the other hand, when the accuracy is equal to or larger than the threshold value and sufficient (YES in step S804), the processing proceeds to step S806.

Figure 11A:
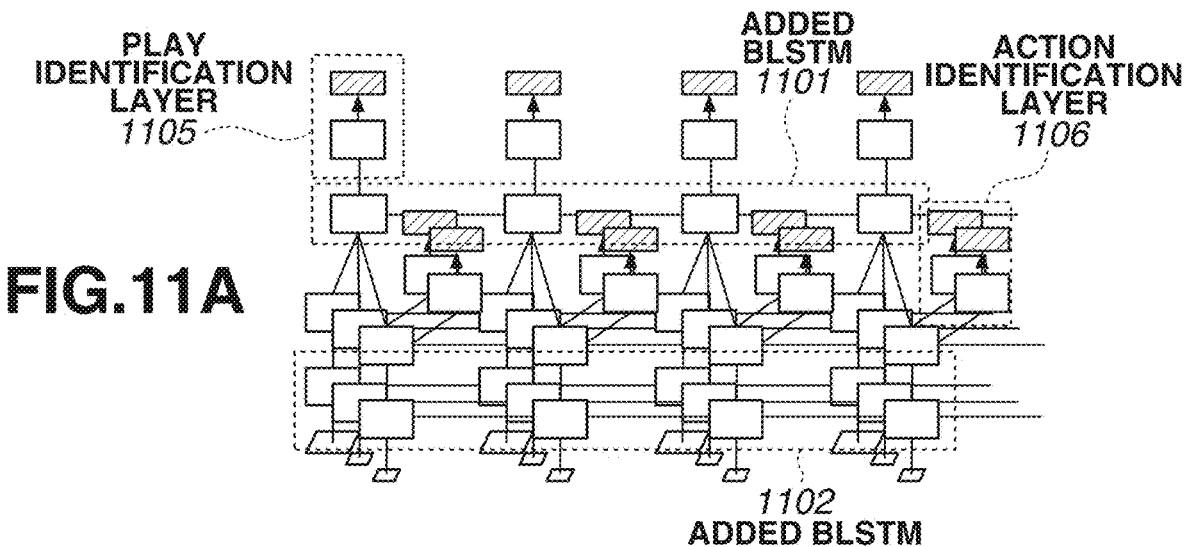
FIGS. 11A, 11B, and 11C illustrate measures to be taken in a case where the accuracy of recognition tasks is not sufficient.
Figure 11B:
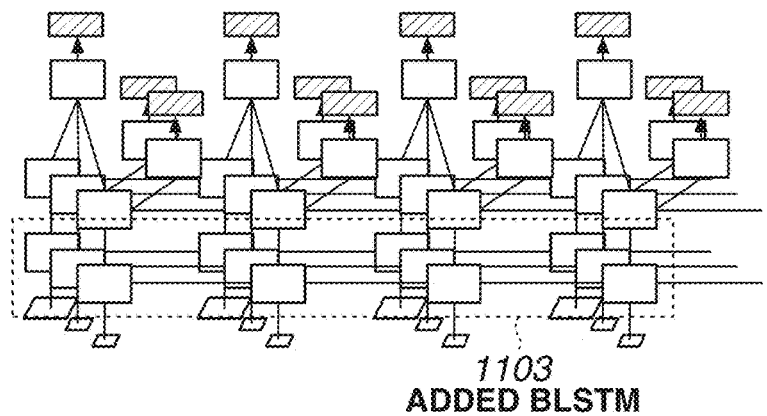
Figure 11C:
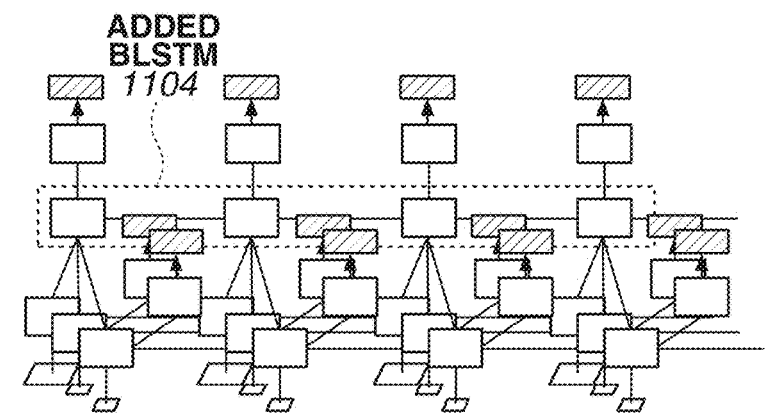

In step S805, the layer addition unit 704 adds a BLSTM to the following stage of the existing BLSTM for each task. If the accuracy is not sufficient for both the action identification and the play identification, the layer addition unit 704 adds BLSTMs 1101 and 1102 to the lower part of the play identification layer 1105 and the lower part of the action identification layer 1106, respectively, as illustrated in FIG. 11A. If only the accuracy of action identification is not sufficient, the layer addition unit 704 adds a BLSTM 1103 only to the lower part of the action identification layer 1106, as illustrated in FIG. 11B. On the other hand, if only the accuracy of play identification is not sufficient, the layer addition unit 704 adds a BLSTM 1104 only to the lower part of the play identification layer 1105, as illustrated in FIG. 11C. Then, the processing returns to step S802.

On the other hand, if the accuracy is sufficient for both identification tasks, the branch position of the identification layer of each identification task is determined. In step S806, the accuracy evaluation unit 703 determines whether the accuracy is sufficient for all tasks. If the accuracy is not sufficient for a certain task as a result of the determination (NO in step S806), the processing proceeds to step S807.

Figure 12:
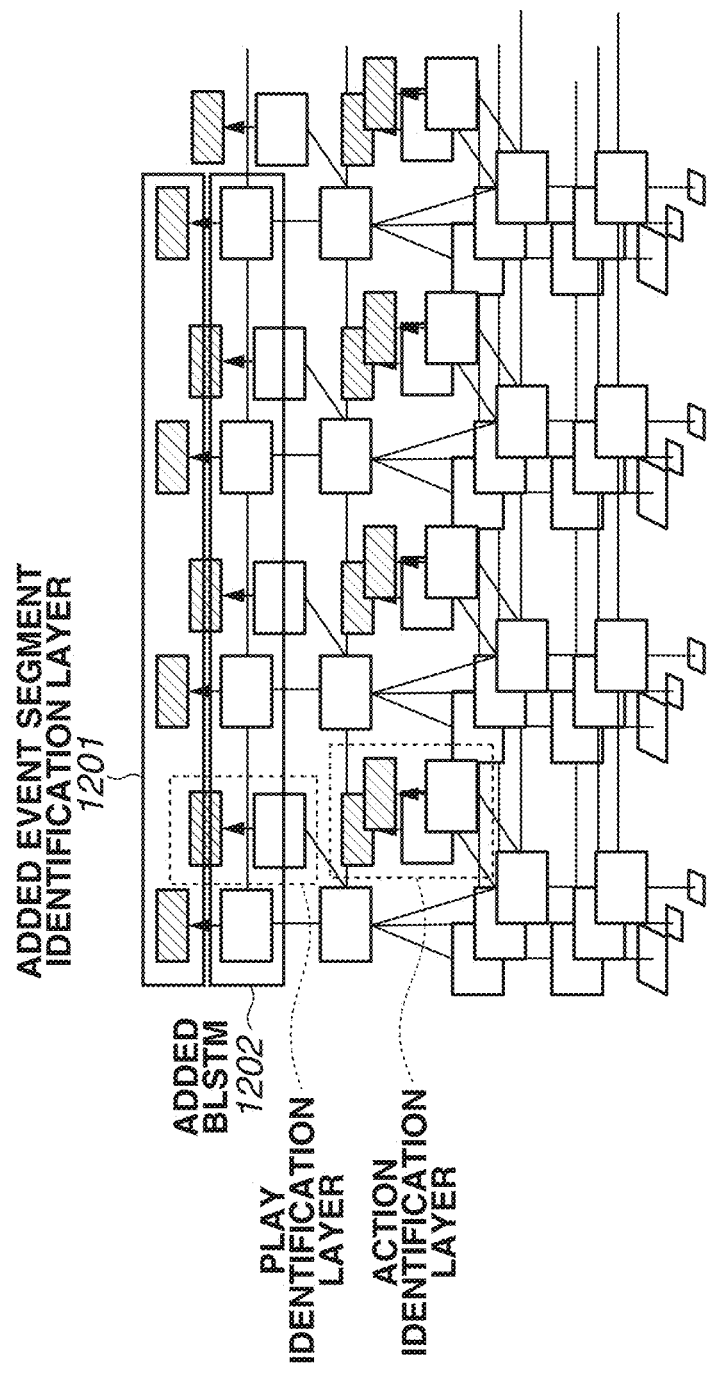
FIG. 12 illustrates processing in a case where an identification layer is added.

In step S807, the task addition unit 705 adds a task. Then, after completion of step S805, a BLSTM and an identification layer for the task to be added are added. If the state illustrated in FIG. 11A indicates the present state, an event segment identification layer 1201 is added to the final layer in step S807, and a BLSTM 1202 is added to the lower part of the event segment identification layer 1201 in step S805, as illustrated in FIG. 12.

Subsequently, the learning apparatus 700 performs steps S802 and S803 again and addition of a BLSTM and search for the branch position of the identification layer are repetitively carried out until the accuracy finally becomes sufficient for all tasks.

According to the present exemplary embodiment, as described above, it is possible to implement a RNN which performs multitasking with different time scales, i.e., the action identification, play identification, and event segment identification. This enables concurrently estimating the action label, play label, and event segment label for input of a moving image of a sport.

A second exemplary embodiment will be described below. The present exemplary embodiment will deal with an example of a CNN which performs multitasking with different spatial scales. The technique discussed in Non-Patent Document 2 investigates, through cloud sourcing, to what each layer responds in a 7-layer CNN that has learned through object detection tasks of 1000 classes. When images corresponding to the receptive field were classified by workers, many replies were that the first layer responded to colors and simple graphics, the second layer responded to textures, the third layer responded to areas and surfaces, and the fourth layer responded to object parts, and the fifth layer responded to objects. This indicates that the above-described characteristics are implicitly acquired in low level layers in order to finally implement object detection of 1000 classes. By learning the object detection in the final layer, and at the same time actively learning the simple graphics, textures, area division, and other primitive image recognitions under a framework of supervised learning in low level layers, a CNN which performs multitasking with different spatial scales is able to learn through one network.

Therefore, the present exemplary embodiment will be described below dealing with a method for determining a structure of a neural network, a learning method, and an identification method with respect to a plurality of tasks which are particularly important for computer vision and easy to learn through a supervised learning mechanism. More specifically, the following describes a method for determining, learning and identifying a structure of a neural network, which performs three tasks: "edge detection", "object contour detection", and "object detection".

The following describes processing for identifying an image by using a CNN learned according to the present exemplary embodiment. The CNN is a neural network, which often performs convolutional calculations, and is discussed in Non-Patent Document 1 and Non-Patent Document 2. More specifically, in the CNN, a feature extraction layer is implemented by a combination of a convolutional layer (Conv) and non-linear processing (including a rectified linear unit (ReLU) and max pooling (Pool)). Then, the CNN outputs an image classification result (likelihood for each layer) via a fully-connected layer (FC).

Figure 13:
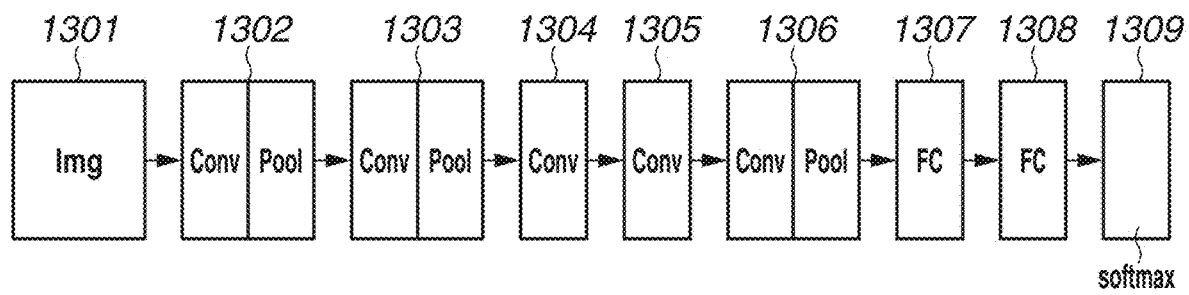
FIG. 13 illustrates an example of a network structure of a CNN.

FIG. 13 illustrates an example of a network structure discussed in Non-Patent Document 1. When an image Img1301 is input, feature extraction is performed by sequentially applying Conv+Pool 1302, Conv+Pool 1303, Conv 1304, Conv 1305, and Conv+Pool 1306 to the image Img 1301. Then, in identification layers, a FC 1307, a FC 1308, and a Softmax 1309 are carried out, and a multi-class category likelihood is output. While non-linear processing (ReLU) is performed after all Convs and FCs, the processing is omitted for simplification in the example illustrated in FIG. 13. When inputting the image Img1301 to the CNN, it is a common practice to resize and crop the image into a predetermined size and then perform preprocessing such as normalization.

FIG. 4B is a block diagram illustrating an example of a functional configuration of an image recognition apparatus 430 according to the present exemplary embodiment. The hardware configuration of the image recognition apparatus 430 according to the present exemplary embodiment is similar to that illustrated in FIG. 3.

The image recognition apparatus 430 according to the present exemplary embodiment includes an image acquisition unit 431, a preprocessing unit 432, a first intermediate feature amount acquisition unit 433, a second intermediate feature amount acquisition unit 434, a third intermediate feature amount acquisition unit 435, an edge detection unit 436, an object contour detection unit 437, and an object detection unit 438. Each of these functions included in the image recognition apparatus 430 will be discussed in detail below with reference to FIG. 5B.

FIG. 5B is a flowchart illustrating an example of a processing procedure performed by the image recognition apparatus 430 according to the present exemplary embodiment.

In step S531, the image acquisition unit 431 acquires still images to be subjected to multitasking recognition. Still images may be acquired from an external storage device or newly acquired by an imaging apparatus such as a still camera.

In step S532, the preprocessing unit 432 performs preprocessing on the input image acquired in the preceding process. In this case, the preprocessing unit 432 performs preprocessing for normalizing color components of the input image to resize the image into a size of about 256×256 and then cropping the image into a size of about 224×224.

Then, each of the three intermediate feature amount acquisition units (the first intermediate feature amount acquisition unit 433, the second intermediate feature amount acquisition unit 434, and the third intermediate feature amount acquisition unit 435) acquire the feature amount from the preprocessed input image. Then, the edge detection unit 436, the object contour detection unit 437, and the object detection unit 438 perform edge extraction, object contour extraction, and object detection, respectively. Each of the three intermediate feature amount acquisition units is a CNN having a structure optimized in the learning processing (described below).

Figure 14:
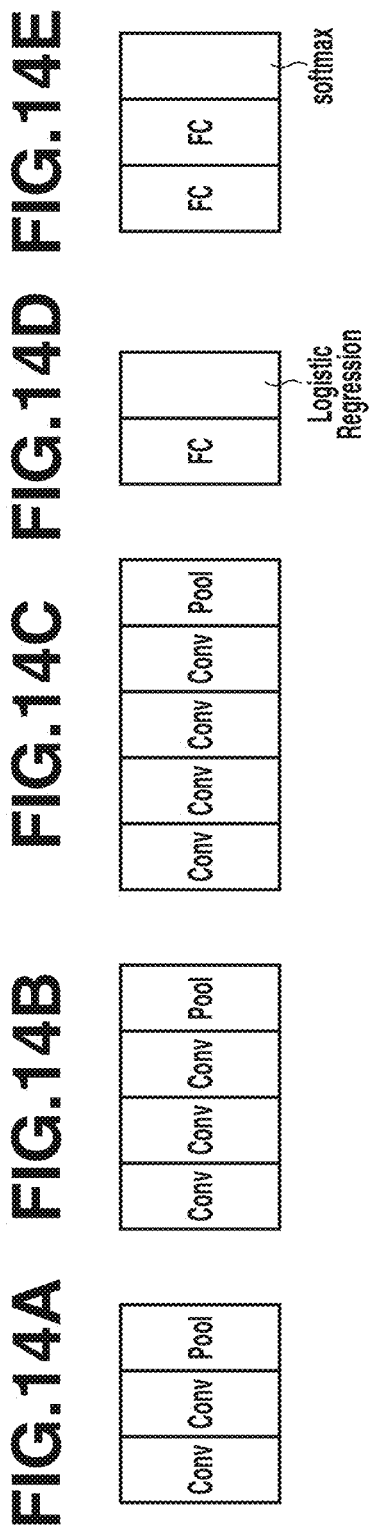
FIGS. 14A to 14E illustrate feature extraction units and identification units in a CNN.

In order to implement a CNN for performing multitasking with different scales, basic units as illustrated in FIGS. 14A to 14E are discussed. FIGS. 14A to 14C illustrate examples of units of feature extraction layers (feature extraction units) as combinations of Conv and Pool. The lower level layer side uses the feature extraction unit illustrated in FIG. 14A, the intermediate layer side uses the feature extraction unit illustrated in FIG. 14B, and the higher level layer side uses the feature extraction unit illustrated in FIG. 14C.

In the edge extraction and object contour extraction, since binary classification is performed for each pixel, an identification unit combining the FC and Logistic Regression as illustrated in FIG. 14D is used as an identification layer. The FC is not connected with the all-channel all-response map of the final layer of the feature extraction unit as usual. 4×4 regions on the map are fully connected in the channel direction and binary determination is performed at each point on the map. Then, in the object detection as the final output, since multi-class classification is performed, the identification unit (FC×2+Softmax) as illustrated in FIG. 14E is used.

Figure 15:
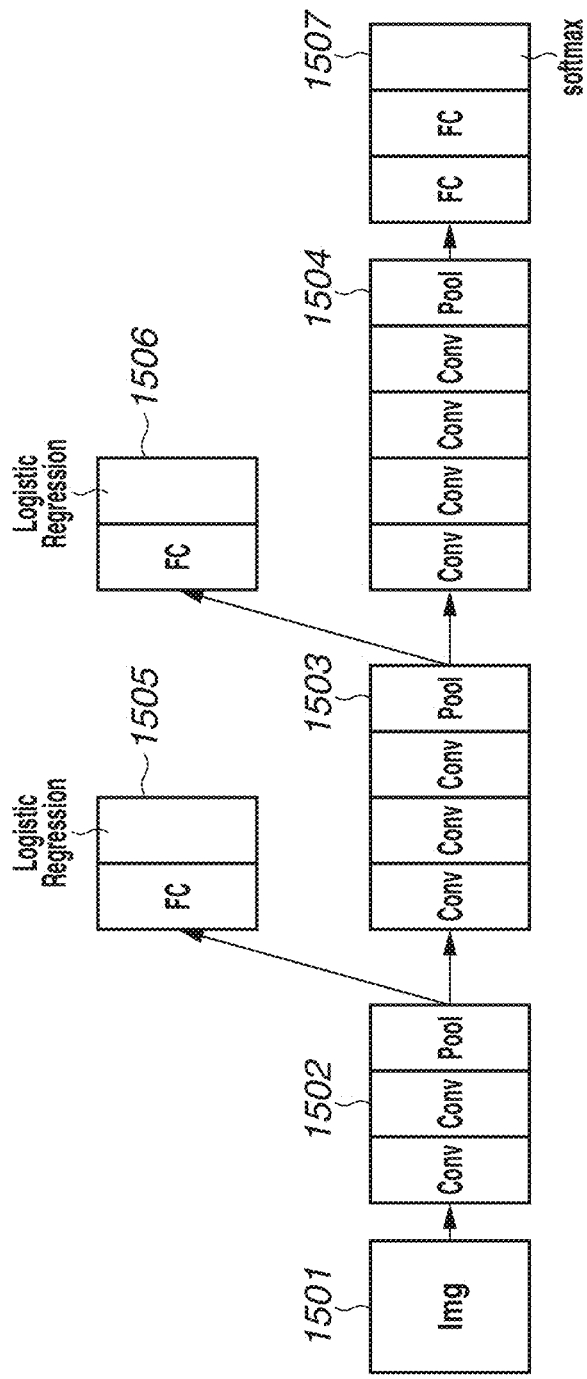
FIG. 15 illustrates an example of a network structure of a CNN according to one or more aspects of the present disclosure.

FIG. 15 illustrates a network of each component illustrated in FIG. 4B and an input image, by using the units illustrated in FIGS. 14A to 14E. The first intermediate feature amount acquisition unit 433 is implemented by the feature extraction unit (Conv×2+Pool) illustrated in FIG. 14A. The second intermediate feature amount acquisition unit 434 is implemented by the feature extraction unit (Conv×3+Pool) illustrated in FIG. 14B. The third intermediate feature amount acquisition unit 435 is implemented by the feature extraction unit (Conv×4+Pool) illustrated in FIG. 14C. As described above, the edge detection unit 436 and the object contour detection unit 437 are implemented by the identification unit (Logistic Regression) illustrated in FIG. 14D. The object detection unit 438 is implemented by an identification unit (Softmax) illustrated in FIG. 14E.

As illustrated in FIG. 15, an identification unit (Logistic Regression) 1505 performs edge detection on an input image 1501 via a feature extraction unit 1502. Then, an identification unit (Logistic Regression) 1506 performs object contour extraction on another output of the feature extraction unit 1502 via a feature extraction unit 1503. An identification unit (Softmax) 1507 performs object detection on the output of the feature extraction unit 1503 via the feature extraction unit 1504.

In step S533, the first intermediate feature amount acquisition unit 433 acquires the first intermediate feature amount related to edge detection from the preprocessed input image. In step S534, the edge detection unit 436 detects edges in the image from the first intermediate feature amount.

In step S535, the second intermediate feature amount acquisition unit 434 acquires the second intermediate feature amount related to object contours based on the first intermediate feature amount. In step S536, the object contour detection unit 437 detects object contours from the second intermediate feature amount.

In step S537, the third intermediate feature amount acquisition unit 435 acquires the third intermediate feature amount related to object detection based on the second intermediate feature amount. In step S538, the object detection unit 438 detects objects in the image from the third intermediate feature amount.

As described above, the processing in steps S533, S535, S537, and S538 is similar to recognition processing in a common CNN, therefore, detailed descriptions thereof will be omitted. The processing in steps S534 and S536, i.e., binary classification for each pixel is implemented with reference to a method discussed in Non-Patent Document 8 (Li Shen, Teck Wee Chua, Karianto Leman, "Shadow optimization from structured deep edge detection", CVPR2015). More specifically, 4×4 regions on a response map of the final layer of the feature extraction units are fully connected with a 25-dimensional FC in the channel direction. In this method, in the receptive field corresponding to 4×4 regions on the response map, binary determination about the presence or absence of an edge is performed on all 5×5-pixel points at the center.

Thus, in the above-described processing, identification tasks for the edge extraction, object contour extraction, and object detection through one network can be concurrently implemented on the input image. The following describes a learning method for the feature extraction units and identification units used in steps S533 to S538 and a network structure search method illustrated in FIG. 15 according to the present exemplary embodiment. The configuration of the learning apparatus according to the present exemplary embodiment is similar to that according to the first exemplary embodiment, and the learning processing procedure according to the present exemplary embodiment is basically similar to that illustrated in FIG. 8. Differences from the first exemplary embodiment will be described below.

In step S801, the network structure initialization unit 701 first initializes the network structure of the CNN. In step S802, the network parameter optimization unit 702 optimizes network parameters of the identification units and feature extraction units for edge detection, object contour detection, and object detection tasks built in the network. In step S803, the accuracy evaluation unit 703 evaluates the accuracy for each task by using evaluation data for each of edge detection, object contour detection, and object detection tasks. In step S805, the layer addition unit 704 adds the feature extraction unit illustrated in FIG. 14A to 14C to tasks having insufficient accuracy. In step S807, the task addition unit 705 adds the identification unit for object detection illustrated in FIG. 14E.

Similar to the first exemplary embodiment, in the learning data to be used, a correct solution label may be assigned to the learning image for each of the edge detection, object contour detection, and object detection tasks. On the other hand, learning images and correct solution labels may be separately prepared for each of the edge detection, object contour detection, and object detection tasks. In the former case, in step S802, the network parameter optimization unit 702 needs to mix gradients, similar to the first exemplary embodiment to optimize the parameters. In the latter case, in step S802, the network parameter optimization unit 702 needs to change a loss function for each task, similar to a method discussed in Non-Patent Document 5 to optimize the parameters.

In the latter case, public data set for the same task may be utilized. For example, Large Scale Visual Recognition Challenge (ILSVRC) for object detection, and Berkeley Segmentation Dataset (BSD500) for object contour detection are included in the public data. In Microsoft (registered trademark) COCO, since annotations of both object label and its object region are given, this data set may be used to instruct both the object detection and object contour detection tasks for concurrent learning. In edge detection, while a user may give correct solution labels to generate learning data, it is also possible to use an output of an existing algorithm, such as the Sobel method and Canny method, as correct solution labels, and instruct the network to learn to imitate the correct solution labels.

According to the present exemplary embodiment, as described above, it is possible to implement a CNN which performs multitasking (edge detection, object contour detection, and object detection) with different spatial scales. This allows the edge detection, object contour detection, and event segment detection tasks for an image at one time.

A third exemplary embodiment will be described below. The present exemplary embodiment will be described below dealing with an example of a CNN which implements image recognition for imaging control for the camera and image recognition for development through a multitask with a different measure of problem complexity. More specifically, identification tasks to be handled by the present exemplary embodiment include focusing determination, smile detection, color temperature estimation, and scene classification.

Of these tasks, focusing determination is performed through camera autofocus control based on a contrast method, and can be implemented with low order features. Smile detection is generally performed based on the shape of the angle of mouth, and therefore features in the intermediate scale are effective. Color temperature estimation is used for white balance correction for reducing color changes of a subject due to color tone of a light source in an image capturing environment. The color temperature is estimated based on the color deviation in achromatic color regions. Since colors as primitive features and higher-order features for detecting achromatic color regions in an image may be effective in combination, identification units for performing identification based on outputs of a plurality of intermediate layers will be considered below. In scene classification, image capturing scenes are classified into "portrait", "ceremonial photograph", "scenery", "night view", "urban area", and "macro" which are referenced when determining the sensor sensitivity, diaphragm, shutter speed, and other control parameters. Imaging scene classification is performed in the final layer since information about the entire image is required. As described above, the spatial scale of each task increases in order of focusing determination, smile determining, and scene classification, and feature amounts with a plurality of scales are used for color temperature estimation.

FIG. 4C is a block diagram illustrating an example of a functional configuration of an image recognition apparatus 450 according to the present exemplary embodiment. The hardware configuration of the image recognition apparatus 450 according to the present exemplary embodiment is similar to that illustrated in FIG. 3.

The image recognition apparatus 450 according to the present exemplary embodiment includes an image acquisition unit 451, a preprocessing unit 452, a first intermediate feature amount acquisition unit 453, a second intermediate feature amount acquisition unit 454, a third intermediate feature amount acquisition unit 455, a focusing determination unit 456, a smile detection unit 457, a color temperature estimation unit 458, and a scene classification unit 459. These functions of the image recognition apparatus 450 will be discussed in detail below with reference to FIG. 5C.

FIG. 5C is a flowchart illustrating an example of a procedure in the processing performed by the image recognition apparatus 450 according to the present exemplary embodiment. According to the present exemplary embodiment, feature extraction units as illustrated in FIGS. 14A to 14C and identification units as illustrated in FIGS. 14D and 14E which are similar to the second exemplary embodiment are employed, and a basic processing flow is similar to that according to the second exemplary embodiment. Therefore, the present exemplary embodiment will be described below dealing with differences from the second exemplary embodiment with reference to FIG. 16.

In step S551, the image acquisition unit 451 acquires an image from an imaging device. In step S552, the preprocessing unit 452 performs preprocessing on the image acquired in step S551. This processing is similar to that in step S532 according to the second exemplary embodiment.

Figure 16:
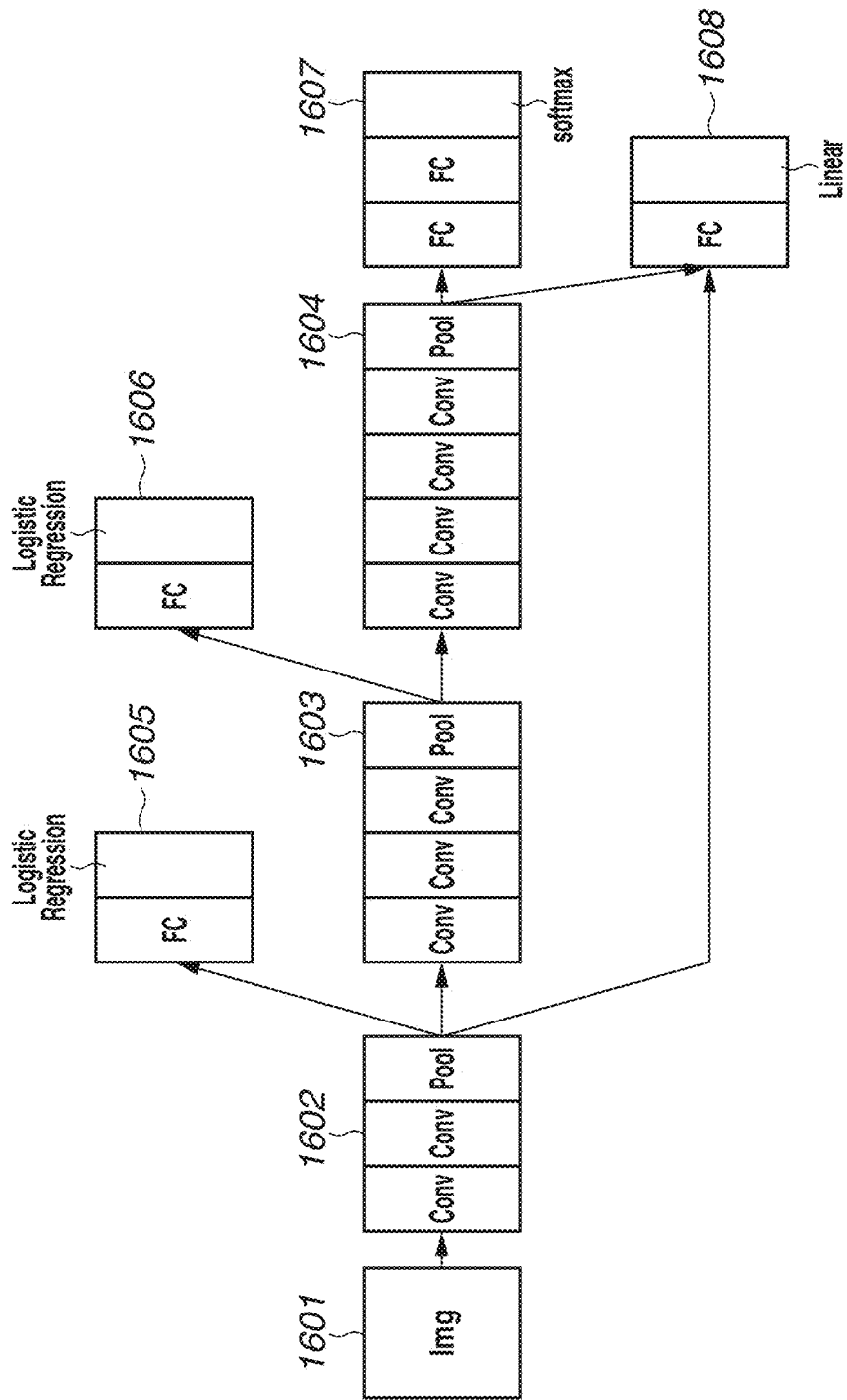
FIG. 16 illustrates an example of a network structure of a CNN according to one or more aspects of the present disclosure.

In step S553, the first intermediate feature amount acquisition unit 453 acquires the first intermediate feature amount from the preprocessed input image. More specifically, the first intermediate feature amount acquisition unit 453 is implemented by a feature extraction unit (Conv×2+Pool) 1602 as illustrated in FIG. 16 similar to the second exemplary embodiment, and acquires the feature amount related to focusing determination from an input image 1601. In step S554, the focusing determination unit 456 determines whether the image is in focus based on the first intermediate feature amount. In this determination, binary classification is performed. Unlike edge detection according to the second exemplary embodiment, the entire response map of the feature extraction unit 1602 is fully connected with the FC layer of the identification unit 1605, and the identification unit 1605 performs binary determination of in or out of focus over the entire image.

In step S555, the second intermediate feature amount acquisition unit 454 acquires the second intermediate feature amount based on the first intermediate feature amount. More specifically, the second intermediate feature amount acquisition unit 454 is implemented by a feature extraction unit (Conv×3+Pool) 1603 similar to the second exemplary embodiment, and acquires the feature amount related to smile detection. In step S556, similar to object contour detection according to the second exemplary embodiment, the smile detection unit 457 performs binary determination of the presence or absence of a smiling face by using an identification unit 1606 at each point of the response map of the second feature extraction unit 1603.

In step S557, the third intermediate feature amount acquisition unit 455 acquires the third intermediate feature amount based on the second intermediate feature amount. More specifically, the third intermediate feature amount acquisition unit 455 is implemented by a feature extraction unit (Conv×4+Pool) 1604 similar to the second exemplary embodiment, and acquires the feature amount related to image capturing scenes.

In step S558, the color temperature estimation unit 458 estimates the color temperature based on the first and the third intermediate feature amounts. Since the identification unit 1608 according to the present process receives inputs from a plurality of layers, the FC layer is fully connected with the first feature extraction layer 1602 and the third feature extraction layer 1604. Since the color temperature is a continuous value, the identification unit 1608 performs recurrence instead of classification, and the final layer involves linear mapping.

In step S559, the scene classification unit 459 classifies image-capturing scenes of images based on the third intermediate feature amount. Similar to object detection according to the second exemplary embodiment, this processing performs multi-class classification on the entire image. Therefore, in the final layer identification unit (Softmax) 1607 is used.

For the input image, the above-described recognition processing allows concurrent implementing of the four tasks (focusing determination, smile detection, color temperature estimation, and scene classification) by performing processing through one network using the network structure as illustrated in FIG. 16. The following describes differences of the present exemplary embodiment from the second exemplary embodiment in the learning method for the feature extraction units and identification units used in steps S553 to S559 and the network structure search method illustrated in FIG. 16.

In the network structure search, a method similar to that according to the second exemplary embodiment is used for the three tasks (focusing determination, smile detection, and scene classification) except for color temperature estimation in which outputs of a plurality of intermediate layers are used. Subsequently, by using only the parameters of the identification layer for color temperature estimation as learning parameters, an intermediate layer for color temperature estimation with higher accuracy is searched. In a case where the structure includes n intermediate units in total as a result of the network structure search, searching for two combinations among n intermediate units enables covering all combinations of patterns for using inputs of two intermediate layers. Since color temperature estimation is a recurrence issue, the final layer of the identification unit involves linear mapping. Then, the parameters are optimized by using a loss function with a squared error. Other learning methods can be implemented by processing similar to those according to the second exemplary embodiment, and redundant descriptions thereof will be omitted.

According to the present exemplary embodiment, it is possible to implement a CNN which performs multitasking useful in camera control including focusing determination, smile detection, color temperature estimation, and scene classification. Thus, a plurality of tasks can be processed at one time in recognition processing.

Other Embodiments

The present disclosure can also be achieved when a program for implementing at least one of the functions according to the above-described exemplary embodiments is supplied to a system or apparatus via a network or storage medium, and at least one processor in a computer of the system or apparatus reads and executes the program. Further, the present disclosure can also be achieved by a circuit (for example, an application specific integrated circuit (ASIC)) for implementing at least one function.

According to the present disclosure, a DNN having a plurality of recognition tasks with different scales makes it possible to perform recognition processing by using a network where identification layers are branched from one intermediate layer.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-094694, filed May 11, 2017, which is hereby incorporated by reference herein in its entirety.

What is claimed is:

1. An image recognition apparatus for recognizing a target, the apparatus including a hierarchical neural network having cascaded layers, the apparatus comprising:
    a first intermediate layer in the cascaded layers configured to acquire from an output of a layer preceding to the first intermediate layer, a first intermediate feature amount;
    a first identification unit configured to perform first identification of a first object in input video data based on the first intermediate feature amount;
    a second intermediate layer, succeeding to the first intermediate layer in the cascaded layers, configured to acquire from an output of a layer preceding to the second intermediate layer, a second intermediate feature amount; and
    a second identification unit configured to perform second identification of a second object, which is larger than the first object on a time scale in the input video data based on the second intermediate feature amount;
    wherein the second object is larger than the first object on a spatial scale and the hierarchical neural network is a convolutional neural network (CNN), and
    wherein the second identification unit further performs the second identification based on the first intermediate feature amount.

2. The image recognition apparatus according to claim 1, wherein the first identification unit is implemented by a network branched from an intermediate layer of the hierarchical neural network.

3. The image recognition apparatus according to claim 1, further comprising:
    a third intermediate layer, succeeding to the second intermediate layer in the cascaded layers, configured to acquire from the second intermediate feature amount a third intermediate feature amount having a larger time scale than the first identification; and
    a third identification unit configured to perform third identification based on the third intermediate feature amount.

4. The image recognition apparatus according to claim 1, wherein the input video data is a moving image.

5. The image recognition apparatus according to claim 1, further comprising:
    a first storage unit configured to store the first intermediate feature amount of a present step; and
    a second storage unit configured to store the first intermediate feature amount of the present step and the second intermediate feature amount of a preceding step.

6. A learning apparatus for learning a classifier of the image recognition apparatus according to claim 1, the learning apparatus comprising:
    an initialization unit configured to initialize intermediate layers, and identification units for performing respective identification;
    a learning unit configured to learn the intermediate layers and the identification units initialized by the initialization unit, by using learning data; and
    an addition unit configured to add a new intermediate layer or an identification unit according to a result of the learning by the learning unit.

7. The learning apparatus according to claim 6, wherein the initialization unit sets a network structure in which the number of the intermediate and the identification layers is minimized.

8. The learning apparatus according to claim 6, wherein the addition unit adds a new intermediate layer to a later stage of the intermediate layer or adds a new identification layer to a final layer of the intermediate layer according to a result of the learning by the learning unit.

9. The learning apparatus according to claim 8, wherein, when adding a new intermediate layer, the addition unit adds the new intermediate layer to a lower part of the identification layer.

10. The learning apparatus according to claim 6, further comprising an evaluation unit configured to evaluate a result of the learning by the learning unit with use of verification data, wherein, when an accuracy is less than a threshold value as a result of the evaluation by the evaluation unit, the addition unit adds a new intermediate layer.

11. The learning apparatus according to claim 6, wherein the learning unit carries out learning by using the learning data including correct solutions corresponding to the identifications by the first and the second identification units respectively.

12. The learning apparatus according to claim 6, wherein the learning unit carries out learning by using a stochastic gradient descent.

13. A method for controlling a learning apparatus for learning a classifier of the image recognition apparatus according to claim 1, the method comprising:
    initializing intermediate layers and identification units for performing respective identification;
    learning the initialized intermediate layers and identification layers by using learning data; and
    adding a new intermediate layer or an identification unit according to a result of the learning.

14. A non-transitory storage medium storing instructions for causing a computer to execute each step of a learning method for learning a classifier of the image recognition apparatus according to claim 1, the learning method comprising:
    initializing intermediate layers and identification units for performing respective identification;
    learning the initialized intermediate layers and identification layers by using learning data; and
    adding a new intermediate layer or an identification unit according to a result of the learning.

15. A method for controlling an image recognition apparatus for recognizing a target, the apparatus including a hierarchical neural network having cascaded layers, the method comprising:
    acquiring, by a first intermediate layer in the cascaded layers, a first intermediate feature amount, from output of a layer preceding to the first intermediate layer;

identifying a first object in input video data based on the first intermediate feature amount;
acquiring, by a second intermediate layer succeeding to the first intermediate layer in the cascaded layers, a second intermediate feature amount, from an output of a layer preceding to the second intermediate layer; and
identifying a second object, which is larger than the first object on a time scale in the input video data based on the second intermediate feature amount,
wherein the second object is larger than the first object on a spatial scale and the hierarchical neural network is a convolutional neural network (CNN), and
wherein the identifying the second object is performed based on the first intermediate feature amount.

16. A non-transitory storage medium storing instructions for causing a computer to execute each step of a method for controlling an image recognition apparatus for recognizing a target, the apparatus including a hierarchical neural network having cascaded layers, the method comprising:
acquiring, by a first intermediate layer in the cascaded layers, a first intermediate feature amount, from output of a layer preceding to the first intermediate layer;
identifying a first object in input video data based on the first intermediate feature amount;
acquiring, by a second intermediate layer succeeding to the first intermediate layer in the cascaded layers, a second intermediate feature amount, from an output of a layer preceding to the second intermediate layer; and
identifying a second object, which is larger than the first object on a time scale in the input video data based on the second intermediate feature amount,
wherein the second object is larger than the first object on a spatial scale and the hierarchical neural network is a convolutional neural network (CNN), and
wherein the identifying the second object is performed based on the first intermediate feature amount.

* * * * *